INVENTOR.
JOSEPH J. LINDLEY

Oct. 11, 1960   J. J. LINDLEY   2,955,666
POWERED CARRIAGE
Filed June 8, 1959   2 Sheets-Sheet 2
FIG. 3
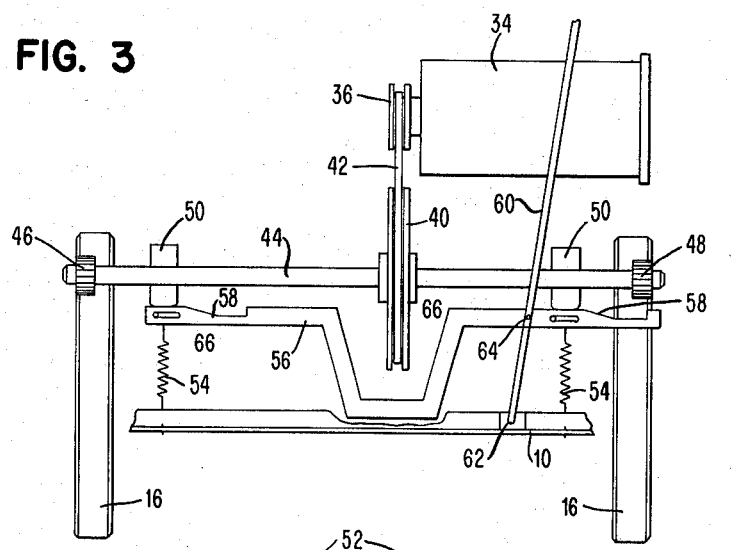
FIG. 4
FIG. 4a
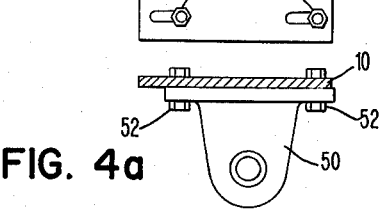
FIG. 5
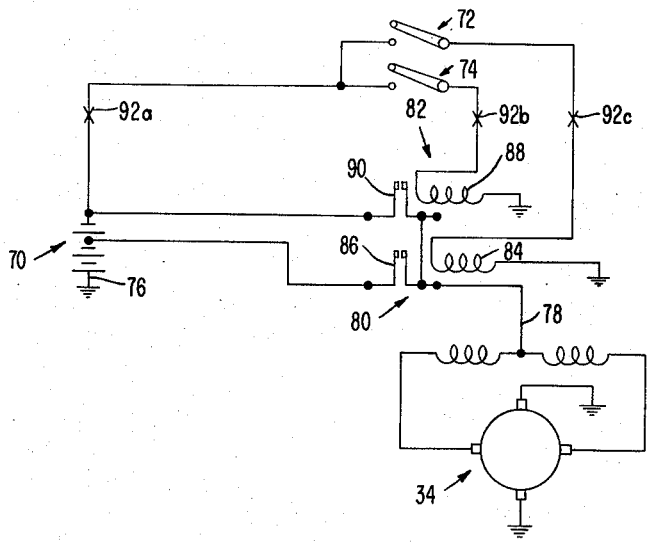

United States Patent Office 2,955,666
Patented Oct. 11, 1960

2,955,666

POWERED CARRIAGE

Joseph J. Lindley, Box 21, Veterans Administration Hospital, Richmond, Va.

Filed June 8, 1959, Ser. No. 818,731

2 Claims. (Cl. 180—19)

This invention concerns self-propelled carriages and more particularly to a power-driven vehicle for transporting one or more golf bags.

The device of the present invention features extremely simple design with provision for quickly and easily reducing the carriage to several smaller units which may be readily stored in a portion of a compartment such as the trunk of an automobile. Furthermore, the apparatus is constructed in a manner whereby the cost of manufacture is competitive with the market. Additionally, the device is light in weight, efficient in operation and unusually inexpensive to maintain.

It is an object of this invention to provide a powered carriage which is easily and economically manufactured and maintained.

It is another object of this invention to provide a power-driven vehicle which is efficient in operation.

It is another object of this invention to provide an improved carriage which is readily transportable when separated into several units.

Still another object of this invention is to provide an improved carriage which includes a simplified, direct-drive mechanism between the power source and the wheels which propel the carriage.

Yet another object of the invention is to provide a carriage which may be selectively driven at more than one speed.

Another object of this invention is to provide a novel clutch for use in a powered carriage.

Briefly, the carriage comprises a frame which rotatably supports a pair of traction wheels mounted in axial alignment; an upright steering shaft journaled in the frame and coupled to a third wheel whereby rotation of the steering shaft moves the third wheel to steer the carriage in a desired direction, a driven shaft rotatably mounted in parallel relationship to the axis of the traction wheels and arranged to be selectively moved toward and away from the axis, a pair of gears, each coupled to an end of the driven shaft and engageable with the traction wheels when the driven shaft is moved toward the axis mechanism for rotating the driven shaft at one or more speeds, and a rack suitably attached to the frame for supporting one or more golf bags in a substantially up-right position.

Other and further objects of the present invention will be obvious from a detailed description of the accompanying drawings.

In the drawings:

Figure 3 is a fragmentary diagram of the driven mechanism of the carriage.

Figures 4 and 4a illustrate in plan and elevation, respectively, the connection between one of the bearings which supports the driven shaft and the frame.

Figure 5 is a schematic wiring diagram of the electrical circuit employed in the powered carriage of Figures 1 and 2.

Figure 1:
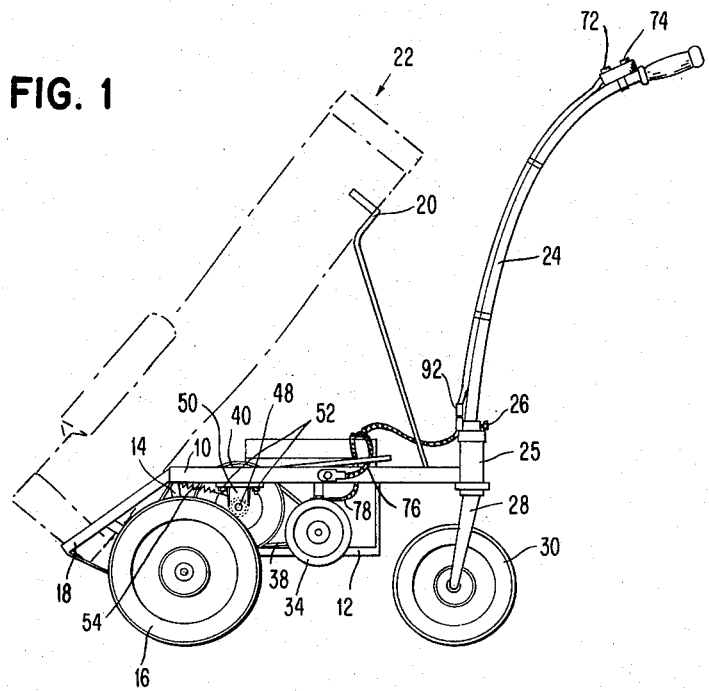
Figure 1 is a side elevation of the powered carriage.
Figure 2:
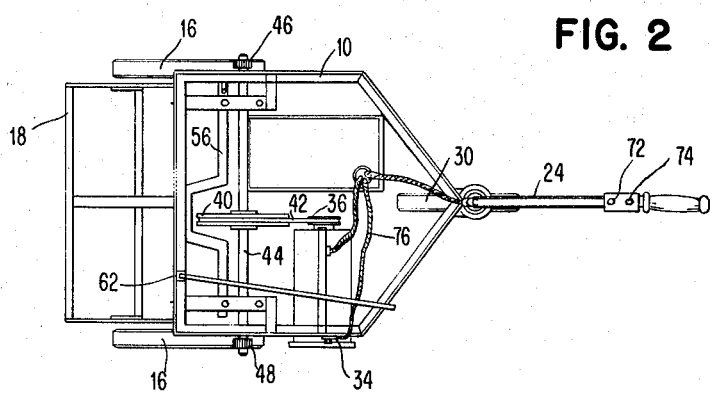
Figure 2 is a top plan view of the carriage with a portion of the rack removed.

Referring now to Figures 1 and 2, there is shown the carriage of the present invention including a frame 10 having a basket 12 for supporting a portion of the driving mechanism. Brackets 14 are attached to each side of the frame and rotatably support a pair of traction wheels 16 including tires. A rack 18 and support member 20 are suitably connected to the frame 10 for supporting one or more golf bags 22 or similar articles. A steering shaft 24 is journaled in a portion 25 of the frame and is releasably secured by a screw 26 in a manner whereby the handle of the cart may be removed when the screw is loosened. Suitable connection is employed between the shaft 24 and a fork 28, the latter rotatably supporting a wheel 30, such that the carriage may be guided by movement of the wheel 30 via movement of the shaft 24. The steering mechanism just described is well known in the bicycle art and requires no further description.

In Figures 1 and 2 the driving mechanism comprises a motor 34 attached to the frame 10 and basket 12, a pulley 36 attached to the shaft of the motor, a pulley 40, a belt 42 in engagement with the pulleys 36 and 40, a shaft 44 to which the pulley 40 is fixed by suitable connection, and gears 46 and 48 attached to the ends of the shaft 44 for selective engagement with the wheels 16. The motor 34 drives the pulley 36, which, in turn, drives the belt 42, the pulley 40, the shaft 44, the gears 46 and 48 and the wheels 16. Actually, the shaft 44 is rotatably supported in bearings 50 (Figure 1), the latter being slidably mounted whereby the shaft 44 and gears 46 and 48 are movable toward or away from the wheels 16 for selective engagement with the latter.

The operation of the drive and clutch mechanisms are best explained by reference to Figure 3 which shows the essential functional elements detached from the carriage. The motor is disengaged from the wheels 16 by breaking the engagement between the gears 46 and 48 and the wheels 16. This is accomplished by moving the shaft 44 and gears 46 and 48 toward and away from the wheels 16 via movement of the bearings 50 with respect to the frame. As stated previously and shown in detail in Figure 4, the bearings 50 are slidably coupled to the frame 10 by bolts 52 (also see Figure 1), and in Figure 3 springs 54 bias the bearings toward the wheels 16 (also see Figure 1). A transverse bar 56 having cam portions 58 is arranged to force the bearings 50 in the direction of the motor 34 so that the gears 46 and 48 are disengaged from the wheels 16 (as in the position shown in Figure 3). This action is accomplished via an arm 60 which is pivotably coupled to the frame at a point 62 and engages the member 56 by means of a connection 64. In the position shown, the gears 46 and 48 are not engaged with the wheels 16 and, accordingly, power to the shaft 44 is not transmitted to the wheels 16. By movement of the arm 60 from right to left, the bearings 50 are permitted to move downwardly along the cam surfaces 58 urged by the springs 54 until the gears 46 and 48 engage the tires of the wheels 16. Thus, the motor is effective, when energized, to drive the wheels 16 and propel the carriage forwardly in a direction selected by operation of the shaft 24. To disengage the drive mechanism, it is only necessary to move the arm 60 from left to right so that the bearings are moved in opposition to the springs 54 and ride upon the high portions of the member 58 as shown in Figure 3.

The circuits are shown diagrammatically in Figure 5 and include the motor 34, a 6-volt battery 70 and a pair of switches 72 and 74 for effecting selective activation of the motor. Two cells of the battery are used for driving the carriage at one speed and three cells are used for driving the carriage at another. The polarity of connections is arbitrary; however, a cable 76 grounds the positive side of the battery to the frame 10 and a cable 78 is provided to the windings of the motor as shown. Solenoids 80 and 82 are arranged to be energized by switches 72 and 74, respectively, to connect 4 and 6 volts, respectively, to the motor 34. When the switch 72 is closed, a coil 84 of solenoid 80 is energized to close the contacts 86 which provide 4 volts to the motor; when the switch 74 is closed, a coil 88 is energized to close contacts 90 of solenoid 82 which provides 6 volts to the motor. The switches 72 and 74 may be of a sophisticated variety which remain closed when depressed and are opened by a subsequent depression. Alternately, they may be ordinary single pole switches well known in the art for establishing a connection between two terminals. Also shown in Figure 5 are connections 92a, b and c which are portions of a connector 92 (shown in Figure 1) which may be disengaged or separated when the handle 24 is removed from the frame, while gears 46 and 48 are shown in this embodiment other members having surfaces suitable for engagement with the wheels to provide driving coupling are acceptable and contemplated. For example, each traction wheel 16 may support a ring gear which may be engaged by one of the gears 46 and 48 for rotating the wheel 16.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A collapsible powered carriage for transporting golf bags and the like comprising, in combination, a substantially flat horizontal frame, a support for golf bags and the like on said frame, a pair of spaced traction wheels rotatably coupled to said frame, said traction wheels including tires of resilient material, a third wheel, a steering shaft rotatably mounting said third wheel and journaled to said frame so that operation of said steering shaft directs said third wheel to guide the carriage, said shaft including a removable upright portion, power means, a mechanism for selectively coupling said power means to said traction wheels, said mechanism including a horizontally extending shaft, a pair of toothed members, one positioned adjacent each of said traction wheels and each secured to said shaft near an end of the latter, bearing means mounting said shaft for rotational movement, said bearing means slidably supported from said frame, spring means biasing said slidably supported bearing means in the direction of said traction wheels whereby said toothed members are biased into driving frictional contact with said traction wheel tires, means including a horizontal transverse bar having cam portions effective upon said shaft mounting bearing means for selective movement of said toothed members into and out of engagement with said tires of said traction wheels, a horizontal arm pivotally mounted to said frame and contacting said transverse bar for shifting the same, and means coupling said power means to said shaft for rotating the latter.

2. A collapsible electric powered golf cart for transporting golf bags containing golf clubs and the like comprising; a substantially flat horizontal frame assembly, an upright support member detachably connected to said frame assembly for supporting the golf bags and the like, a pair of spaced traction wheels having resilient tires rotatably supported from said frame assembly, a third wheel, a steering shaft pivotally mounted to said frame assembly such that operation of said steering shaft directs the third wheel to guide the cart, said steering shaft including a removable upright portion, an electric battery carried by said frame, an electric motor supported on said frame, electrical conductors selectively connecting portions of the battery to the motor such that the motor may be driven at different speeds depending on the amount of battery power applied thereto, circuit controlling switch means mounted on the removable upright portion of said steering shaft for controlling the amount of battery power applied through said conductors to said motor, a horizontal motor drive shaft, a horizontal power shaft, means connecting the horizontal power shaft to the motor drive shaft so that it is driven therefrom, a pair of toothed members secured to opposite ends of said horizontal power shaft adjacent each of said traction wheels, a bearing supporting said horizontal power shaft for rotational movement, a slidable support means for supporting said bearing for horizontal slidable support relative to said frame, spring means biasing said slidably supported bearing in the direction of said traction wheels so that said toothed members are biased into frictional driving contact with said traction tires, a horizontal transverse bar having cam portions thereon adapted to co-operate with said slidably mounted bearing, said transverse bar being mounted for horizontal movement such that the cam portions thereon may contact said bearing and oppose the bias of said springs to move the toothed members out of driving frictional contact with said traction wheel tires, a horizontal arm pivotally mounted to said frame assembly and contacting said horizontal transverse bar for shifting the same to allow said cam portions to act upon said slidably mounted bearings.

References Cited in the file of this patent
UNITED STATES PATENTS

| | | |
|---|---|---|
| 1,598,124 | Evans | Aug. 31, 1926 |
| 2,706,008 | Voigt | Apr. 12, 1955 |
| 2,708,484 | Hoffman | May 17, 1955 |
| 2,749,997 | Deslippe | June 12, 1956 |
| 2,751,030 | Null | June 19, 1956 |
| 2,771,959 | Phelps | Nov. 27, 1956 |
| 2,812,824 | Adams | Nov. 12, 1957 |
| 2,844,209 | Brunderman | July 22, 1958 |